United States Patent
Fezer

(10) Patent No.: US 7,278,390 B2
(45) Date of Patent: Oct. 9, 2007

(54) PISTON-PIN BOSS OF A PISTON FOR AN INTERNAL COMBUSTION ENGINE

(75) Inventor: Eberhard Fezer, Rudersberg-Steinenberg (DE)

(73) Assignee: Mahle GmbH, Stuttgart (DE)

( * ) Notice: Subject to any disclaimer, the term of this patent is extended or adjusted under 35 U.S.C. 154(b) by 193 days.

(21) Appl. No.: 10/536,948

(22) PCT Filed: Nov. 27, 2003

(86) PCT No.: PCT/DE03/03929

§ 371 (c)(1),
(2), (4) Date: Oct. 11, 2005

(87) PCT Pub. No.: WO2004/051119

PCT Pub. Date: Jun. 17, 2004

(65) Prior Publication Data

US 2006/0144351 A1    Jul. 6, 2006

(30) Foreign Application Priority Data

Nov. 29, 2002   (DE)  ................................ 102 55 732

(51) Int. Cl.
*F02F 3/00* (2006.01)
(52) U.S. Cl. ..................... 123/193.6; 92/187
(58) Field of Classification Search ............. 123/193.6, 123/41.35–41.39; 92/187, 238, 158, 160
See application file for complete search history.

(56) References Cited

U.S. PATENT DOCUMENTS

| 3,494,262 | A | 2/1970 | Holcombe |
| 3,583,291 | A | 6/1971 | Zeedik |
| 4,359,973 | A | 11/1982 | Shimada |
| 5,839,351 | A | 11/1998 | Nakada |
| 6,279,456 | B1 * | 8/2001 | Ueshima et al. ............... 92/187 |
| 2002/0066423 | A1 * | 6/2002 | Moloney et al. ......... 123/41.35 |
| 2006/0021500 | A1 * | 2/2006 | Anderson et al. ............. 92/158 |
| 2006/0042584 | A1 * | 3/2006 | Zvonkovic ............... 123/193.6 |

FOREIGN PATENT DOCUMENTS

| DE | 334127 | 5/1920 |
| DE | 3 34 127 | 3/1921 |
| DE | 2 106 923 | 2/1971 |
| DE | 27 43 350 | 9/1977 |
| DE | 27 43 350 | 4/1979 |
| DE | 36 000749 | 7/1987 |
| DE | 3609019 | 9/1987 |
| DE | 37 22 435 | 2/1998 |
| DE | 199 55 197 | 5/2001 |
| DE | 101 17 932 | 10/2002 |

(Continued)

Primary Examiner—Marguerite McMahon
(74) Attorney, Agent, or Firm—Collard & Roe, P.C.

(57) ABSTRACT

The invention related to a piston-pin boss (18) of a piston (6) for an internal combustion engine, comprising a piston-pin bore (1) for receiving a piston pin. To improve the passage of oil and to form an oil reservoir, the interior surface (2) of the bore comprises a transversal groove (5) that lies parallel to the longitudinal axis (3) of the piston-bore (1) and opens towards the exterior of the piston and an oil circulation groove (4) that intersects the transversal groove (5) and encircles the longitudinal axis (3).

6 Claims, 2 Drawing Sheets

FOREIGN PATENT DOCUMENTS

| | | |
|---|---|---|
| EP | 0095052 | 11/1983 |
| EP | 1 101 923 | 11/2000 |
| GB | 659 954 | 10/1951 |
| GB | 1 593 118 | 7/1981 |
| JP | 62111153 | 5/1987 |
| JP | 63013964 | 1/1988 |
| JP | 9 079377 | 3/1997 |
| JP | 9100745 | 4/1997 |
| JP | 09195847 | 7/1997 |
| JP | 9 310640 | 12/1997 |
| JP | 11303993 | 11/1999 |
| JP | 2001295697 | 10/2001 |
| JP | 2001355728 | 12/2001 |

* cited by examiner

PISTON-PIN BOSS OF A PISTON FOR AN INTERNAL COMBUSTION ENGINE

CROSS REFERENCE TO RELATED APPLICATIONS

Applicant claims priority under 35 U.S.C. §119 of German Application No. 102 55 732.2 filed on Nov. 29, 2002. Applicant also claims priority under 35 U.S.C. §365 of PCT/DE2003/003929 filed on Nov. 27, 2003. The international application under PCT article 21(2) was not published in English.

The invention relates to a pin boss of a piston for an internal combustion engine, having a pin bore for accommodating a piston pin, in accordance with the preamble of claim 1.

A piston for an internal combustion engine, having a pin boss that has a pin bore having an inside surface into which a groove-shaped recess, open on both sides, disposed parallel to the longitudinal axis of the pin, is machined, is known from EP patent 0 095 052. While this results in good lubrication of the piston pin during engine operation, the recess does not form an oil reservoir, so that after the engine is shut off, the oil that has collected in the recess flows out of the recess again and is no longer available during a cold start of the engine. The consequences are poor cold-start conditions and emergency running properties.

An internal combustion engine piston having a pin boss, whose pin bore has a semi-circular circumferential groove that lies circular relative to the longitudinal axis of the bore is known from DE-OS 2 106 923. While oil can collect in this groove, outflow of the oil is only possible, in this connection, by way of an oil channel that lies in the direction of the pin crown, pointing upward perpendicularly, so that the oil that has collected therein heats up very greatly and thereby loses some of its lubrication effect.

Proceeding from this, the invention is based on the task of creating a pin boss having a pin bore having a groove system, which not only guarantees a sufficient flow-through of oil for good cooling of the oil and thereby for maintaining its lubrication effect, but at the same time forms an oil reservoir in which oil collects while the internal combustion engine is stopped, contributing to an improvement of the cold-start conditions of the internal combustion engine.

The solution for this task is indicated in the characterizing part of the main claim.

Practical embodiments of the invention are the subject of the dependent claims.

Figure 1:
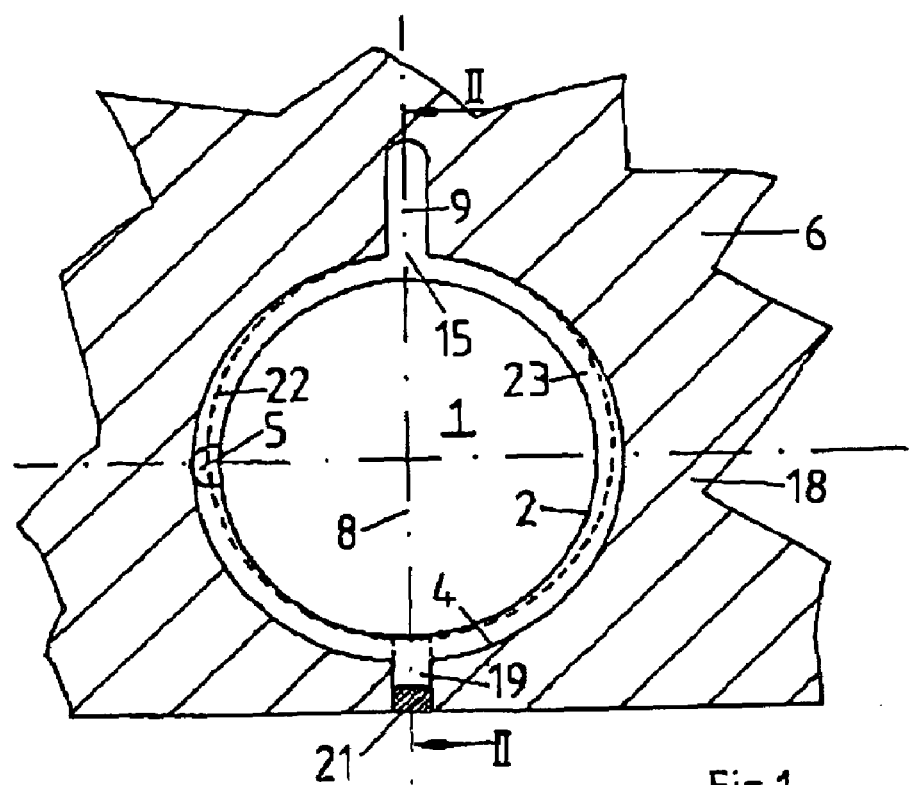
Figure 2:
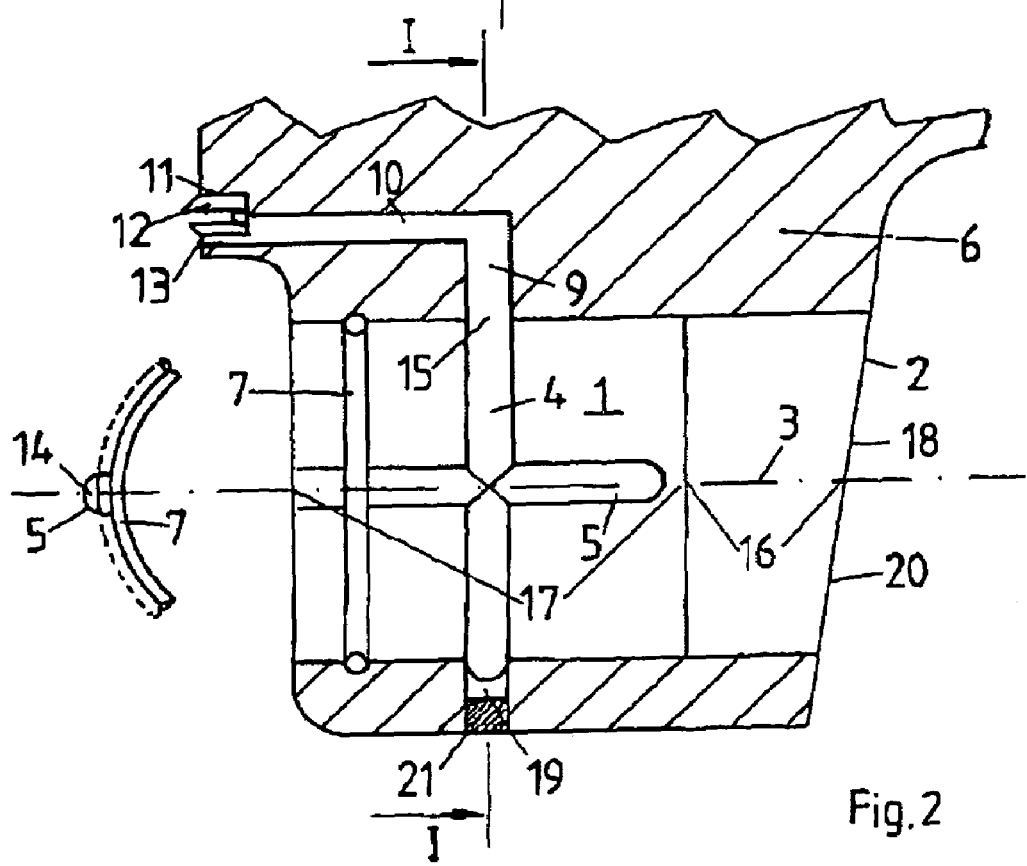
Figure 3:
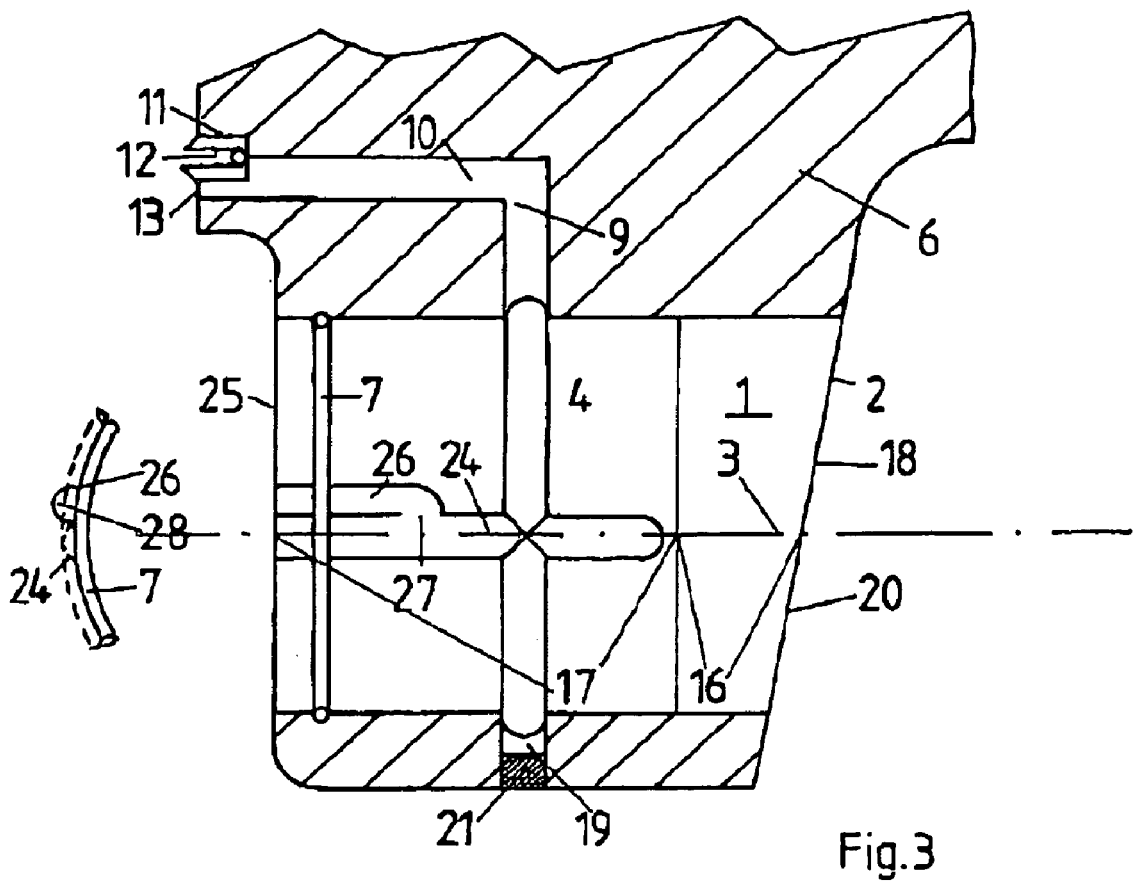
Figure 4:
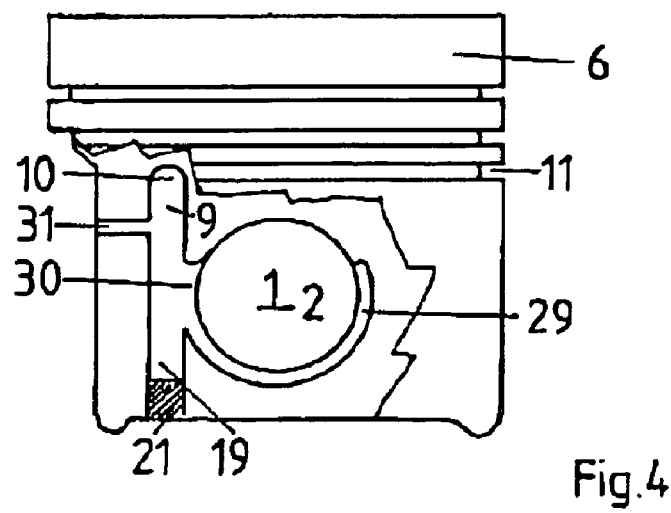

Several exemplary embodiments of the invention are explained below, using the drawings. These show:

FIG. 1 a section through a pin boss of a piston, in the region of an oil circulation groove of the pin bore, along the line I-I in FIG. 2, FIG. 2 a section lying parallel to the axis of the pin bore, through the pin boss, along the line II-II in FIG. 1, FIG. 3 another embodiment of the groove system according to the invention, shown in a section along the line II-II in FIG. 1, with a separate additional groove for oil outflow, and FIG. 4 a piston, shown in partial section, with an embodiment of the oil inflow and outflow system and the oil circulation groove.

FIG. 1, in cross-section, and FIG. 2, in longitudinal section, show one of two pin bosses 18 of a piston 6 for an internal combustion engine, disposed at a distance from one another, each of which has a pin bore 1, the inside surface 2 of which has a non-profile-bored region 17, which is configured to be circular-cylindrical, lying on the outside of the piston, according to the embodiment of the invention shown in FIG. 2, and a profile-bored region 16, which narrows slightly, conically, from the inside of the piston towards the outside of the piston.

The teaching according to the invention can also be used for pin bores that do not have a profile-bored region and are configured to be circular-cylindrical over their entire length, i.e. for pin bores that have a non-profile-bored region that lies centrally, and have a profile-bored region, in each instance, both towards the inside of the piston and the outside of the piston, on both sides of the former.

In each case, an oil circulation groove 4 and a transverse groove 5 that lies axially to it and proceeds from the outside of the pin boss 18 and ends before the profile-bored part 16 of the pin bore 1 that lies on the inside, are machined into the non-profile-bored region of the inside surface 2 of the pin bore 1, which region is indicated as 17 in FIG. 2, circular to the longitudinal axis 3 of the pin bore 1, disposed over the entire circumference of the inside surface 2 of the pin bore 1. In the case of a pin bore that is configured to be purely cylindrical, without any profile-bored region 16 that lies on the inside, the transverse groove 5 ends shortly before the inner face side 20 of the pin boss 18, so that the transverse groove 5 is closed off towards the inside of the piston, when the piston pin is inserted.

According to another exemplary embodiment, not shown in the figures, the transverse groove 5 can also be disposed at a slant towards the outside and in the direction of the piston crown, so that the transverse groove 5 encloses an open, acute angle, which is open towards the outside of the piston, with the longitudinal axis 3. The advantage of this lies in the fact that when the engine is stopped, lubricant oil remains in the transverse groove 5, which improves the cold-start conditions of the engine. In the present exemplary embodiment, the transverse groove 5 is disposed in the equator region of the pin bore 1. In this connection, the transverse groove 5 can also be disposed in the bore half that faces the piston crown or in the bore half that faces away from the piston crown.

Towards the outside of the pin boss 18, the transverse groove 5 is partially closed off by a pin retaining ring 7. However, the transverse groove 5 is machined into the inside surface 2 deeper than the groove of the piston retaining ring 7, so that an outflow opening 14 is formed, from which the oil that has flowed into the transverse groove 5 can flow out.

The transverse groove 5 has the function, for one thing, of distributing the lubrication oil along the longitudinal axis 3 of the pin bore 1, thereby resulting in improved oil wetting of the piston pin (not shown in the figures). For another thing, excess oil flows away out of the pin bore 1, by way of the transverse groove 5, thereby resulting in dissipation of heat that has occurred in the pin boss, and preventing local overheating of the lubrication oil. In engine operation, the lubrication oil flow-through is supported by the gravity and mass forces that act on the lubrication oil. For these reasons, the ability of the pin/boss contact surface of the bore half that faces the piston crown to withstand stress can be increased, when the boss lubrication is intact.

A radially disposed oil supply bore 9, opens into the zenith of the oil circulation groove 4, by way of the opening 15; the former is connected with an oil inflow 10 that opens into an oil outflow opening 13 and lies parallel to the longitudinal axis 3. The latter opening comprises, in part, an oil control ring groove 11 disposed on the outside surface of the piston 6 and, in part, a region on the side of the oil control ring groove 11 facing the crank shaft. In this way, oil stripped off from the cylinder wall by an oil control ring 12 that is disposed in the oil control ring groove 11 gets to the oil inflow 10, into the oil supply bore 9, and therefore into the groove system formed by the oil circulation groove 4 and the transverse groove 5.

Because of the small radius of the pin bore 1, the oil supply bore 9 can only be machined into the zenith of the pin bore 1 by way of an ancillary bore 19. After production of the oil supply bore 9, the ancillary bore 19 can be closed by means of a pin 21. However, closure of the ancillary bore 19 can also be achieved by means of a piston pin introduced into the pin bore 1, in that the oil circulation groove 4 ends on both sides of the ancillary bore 19, so that the mantle surface of the piston pin rests on the inner opening of the ancillary bore 19 and thereby closes it. In another alternative, the ancillary bore 19 can be closed by a piston pin in that the root 22, shown with a broken line in FIG. 1, of an oil circulation groove 23 lies on an imaginary circle that lies eccentric to the circular cross-section of the inside surface 2, in such a manner that the depth of the oil circulation groove 23 is maximal in the region of the oil supply bore 9 and has a zero value in the region of the ancillary bore 19, so that in this connection, as well, the oil circulation groove 23 ends on both sides of the ancillary groove 19, and a piston pin (not shown in the drawing) inserted into the pin bore 1 rests on the inner opening of the ancillary bore 19 with its mantle surface and thereby closes it.

Another embodiment of a transverse groove 24 is shown in FIG. 3; it differs from the transverse groove 5 according to FIG. 2 in that its groove depth is less than the depth of the groove provided for the pin retaining ring 7, so that the transverse groove 24 is closed off towards the outside 25 of the pin boss 18 by the pin retaining ring 7. In this connection, not only the half of the oil circulation groove 4 that faces away from the piston crown, but also the transverse groove 24 form an oil reservoir that contributes to improving the cold-start properties of the engine. The oil circulation that contributes to cooling the pin boss 18 is guaranteed, in this connection, by means of an additional groove 26 that is disposed in the region of the inside surface 2 of the pin bore 1 that faces the piston crown, and is connected with the transverse groove 24 by way of a recess 27, lies parallel to the longitudinal axis 3, and has a greater depth than the groove of the pin retaining ring 7, so that an outflow opening 28 results on the outside 25 of the pin boss 18, through which the oil that flows into the oil circulation groove 4 by way of the oil inflow 10 and the oil supply bore 9, for cooling and lubricating the piston pin, can flow out.

In an embodiment of the invention according to a partial section of a piston 6 shown in FIG. 4, the oil supply bore 9 and the ancillary bore 19 are disposed, as compared with the embodiment shown in FIG. 1, not in the center but at the side of the pin bore 1, in such a manner that an opening 30 forms between the pin bore 1 and the oil supply bore 9, by way of which an oil circulation groove 29 is supplied with oil. The oil inflow 10 is configured in accordance with the embodiments of the invention shown in FIGS. 2 and 3, and only indicated in FIG. 4. Here again, the oil outflow takes place by way of a transverse groove, not shown in FIG. 4. In addition, an additional bore 31 is provided for this purpose, which opens into the oil supply bore 9 close to the oil inflow 10, and connects said bore with the outside of the piston. The purpose of the additional bore 31 consists in offering an additional outflow opening for the lubrication oil, which is under increased pressure due to the operating conditions, in order to avoid piston damage caused by excessively high oil pressure.

In the embodiment of the invention shown in FIG. 4, the oil circulation groove 29 only runs over the nadir region and the equator region of the inside surface 2 of the pin bore 1, so that the zenith region of the inside surface 2 is free of grooves. This has the advantage that in this way, the pin/boss contact surface is increased, and the surface pressure in the zenith region of the pin bore is reduced, so that pin and/or boss damage caused by an overly great surface pressure is avoided, to a great extent.

During operation with the piston pin inserted, the oil circulation groove 4, 29 forms a relatively large oil reservoir into which the oil can run, in the region below the transverse groove 5, 26, if applicable together with the transverse groove 24 that is closed towards the outside. Reduction of the oil supply formed in this oil reservoir takes place exclusively by way of the oil exchange in the pin boss 18, which is normal in operation. The size of the oil reservoir results in a very good oil supply of the piston pin that is mounted to rotate in the pin boss 18, for one thing, thereby increasing the operational reliability very much. For another thing, the oil supply in the oil reservoir is maintained in the rest state, and this results in very good cold-start properties, thereby particularly avoiding boss friction, hard support traces, and seizing between the piston pin and the pin bore 1. Finally, constant circulation of the oil that flows into the groove system 4, 5, 24, 28 via the oil inflow opening 13 and out via the outflow opening 14, 26 takes place during engine operation, thereby guaranteeing good cooling of this oil, and preventing overheating of this oil and thereby coking and a deterioration of the lubrication effect of the oil.

REFERENCE SYMBOLS 1 pin bore
2 inside surface
3 longitudinal axis
4 oil circulation groove
5 transverse groove
6 piston
7 pin retaining ring
8 longitudinal axis of the piston 6
9 oil supply bore
10 oil inflow
11 oil control ring groove
12 oil control ring
13 oil inflow opening
14 outflow opening
15 opening
16 profile-bored region of the pin bore
17 non-profile-bored region of the pin bore
18 pin boss
19 ancillary bore
20 inner face side
21 pin
22 root of the oil circulation groove
23 oil circulation groove
24 transverse groove
25 outside of the pin boss
26 additional groove
27 recess
28 outflow opening
29 oil circulation groove
30 opening
31 additional bore

The invention claimed is:

1. Pin boss (18) of a piston (6) for an internal combustion engine,
   having a pin bore (1) for accommodating a piston pin, which has an inside surface (2) having a non-profile-bored region (17),
   having an oil circulation groove (4, 29) and a transverse groove (5, 24, 26), which are disposed in the non-profile-bored region (17) of the inside surface (2), whereby the transverse groove (5, 24, 26) lies at least approximately parallel to the longitudinal axis (3) of the pin bore (1) and has an outflow opening (14, 28) for draining off cooling oil, on the outside of the piston, and whereby the oil circulation groove (4, 29) is disposed circular to the longitudinal axis (3) and crosses the transverse groove (5, 24, 26), and
   having an oil supply bore (9) that opens into the oil circulation groove (4, 29), which bore is connected with an oil inflow opening (13) disposed on the outside of the piston, by way of an oil inflow (10).

2. Pin boss according to claim 1, wherein the transverse groove (5) is disposed in the half of the pin bore (1) that faces the piston crown or in the half that faces away from the pin crown.

3. Pin boss according to claim 1, wherein the oil circulation groove (4) runs over the entire circumference of the inside surface (2) of the pin bore (1).

4. Pin boss according to claim 1, wherein the oil inflow opening (13) comprises, in part, an oil control ring groove (11) disposed on the outside surface of the piston (6), and, in part, a region on the side of the oil control ring groove (11) facing the crank shaft.

5. Pin boss according to claim 1, wherein the oil supply bore (9) is disposed parallel to the longitudinal axis (8) of the piston (6), and hits the pin bore (1) at a tangent in the region of the oil circulation groove (29), in such a manner that an opening (30) is formed between the oil supply bore (9) and the oil circulation groove (29).

6. Pin boss according to claim 5, wherein the oil circulation groove (29) is disposed in the equator region and the nadir region of the pin bore (1).

* * * * *